(12) United States Patent
Tembad et al.

(10) Patent No.: US 12,372,181 B2
(45) Date of Patent: Jul. 29, 2025

(54) HIGH TOLERANCE QUICK CONNECT COUPLING

(71) Applicant: Hutchinson Fluid Management Systems, Inc., Auburn Hills, MI (US)

(72) Inventors: Chethan Kumar Hanumanthappa Tembad, Auburn Hills, MI (US); Aaron Ritzrow, Shelby Township, MI (US); Steve Todt, Clinton Township, MI (US); Luc Milanini, Beverly Hills, MI (US)

(73) Assignee: Hutchinson Fluid Management Systems, Inc., Auburn Hills, MI (US)

( * ) Notice: Subject to any disclaimer, the term of this patent is extended or adjusted under 35 U.S.C. 154(b) by 457 days.

(21) Appl. No.: 17/162,749

(22) Filed: Jan. 29, 2021

(65) Prior Publication Data

US 2022/0243849 A1 Aug. 4, 2022

(51) Int. Cl.
| | | |
|---|---|---|
| *F16L 37/098* | (2006.01) | |
| *F28F 9/02* | (2006.01) | |
| *H01M 10/613* | (2014.01) | |
| *H01M 10/625* | (2014.01) | |
| *H01M 10/6556* | (2014.01) | |

(52) U.S. Cl.
CPC ........ *F16L 37/0985* (2013.01); *F28F 9/0258* (2013.01); *H01M 10/613* (2015.04); *H01M 10/625* (2015.04); *H01M 10/6556* (2015.04); *H01M 2220/20* (2013.01)

(58) Field of Classification Search
CPC ... F16L 37/0985; F16L 37/505; F16L 41/021; F16L 37/0987; F28F 9/0258; H01M 10/613; H01M 10/625; H01M 10/6556; H01M 220/20; H01M 10/6554
USPC .......................................... 165/80.4
See application file for complete search history.

(56) References Cited

U.S. PATENT DOCUMENTS 5,005,877 A * 4/1991 Hayman ............. F16L 37/0842
285/317
5,046,765 A * 9/1991 Usui .................... F16L 37/1225
285/305

(Continued)

FOREIGN PATENT DOCUMENTS

| EP | 2957809 | 12/2015 | |
|---|---|---|---|
| EP | 2957809 A1 * | 12/2015 | ............ F16L 27/108 |

(Continued)

OTHER PUBLICATIONS

Machine Translation EP 2957809A1 (Year: 2015).*

(Continued)

*Primary Examiner* — Len Tran
*Assistant Examiner* — Gustavo A Hincapie Serna
(74) *Attorney, Agent, or Firm* — Gunther J. Evanina; Butzel

(57) ABSTRACT

A fitting for use in a manifold or other tubular assembly includes a core and at least one tubular coupling sleeve slidably and sealingly fitted over a distal end of the core to accommodate predetermined tolerances in the relative positions of fluid ports connected with the tubular assembly. Features are provided to limit the range of motion to the predetermined tolerances and to prevent disassembly of the coupling sleeve from the core of the fitting.

14 Claims, 3 Drawing Sheets

(56) References Cited

U.S. PATENT DOCUMENTS

| | | | | |
|---|---|---|---|---|
| 7,404,581 | B2* | 7/2008 | Baving | F16L 37/0925 |
| | | | | 277/626 |
| 8,328,241 | B1* | 12/2012 | Mortensen | F16L 37/091 |
| | | | | 285/259 |
| 9,915,384 | B2* | 3/2018 | Tanghetti | F16L 19/12 |
| 10,711,934 | B2 | 7/2020 | Sireude | |
| 10,865,922 | B2 | 12/2020 | Corbett et al. | |
| 11,384,872 | B1* | 7/2022 | Ericksen | B29C 66/543 |
| 11,493,159 | B2* | 11/2022 | Taylor | F16L 37/091 |
| 11,525,534 | B2* | 12/2022 | Kluss | F16L 37/0915 |
| 2002/0163191 | A1* | 11/2002 | Muenster | F16L 37/138 |
| | | | | 285/331 |
| 2005/0006897 | A1* | 1/2005 | Davidson | F16L 37/008 |
| | | | | 285/205 |
| 2008/0106092 | A1* | 5/2008 | Klein | F16L 41/02 |
| | | | | 285/5 |
| 2013/0020797 | A1* | 1/2013 | King | F16L 37/091 |
| | | | | 285/179 |
| 2013/0082461 | A1* | 4/2013 | Hunter | F16L 33/26 |
| | | | | 285/256 |
| 2015/0354741 | A1* | 12/2015 | Montag | F16L 37/0885 |
| | | | | 285/317 |
| 2016/0091131 | A1* | 3/2016 | Roach | F16L 47/02 |
| | | | | 285/285.1 |
| 2017/0021723 | A1* | 1/2017 | Visarius | B60K 15/01 |
| 2017/0328498 | A1* | 11/2017 | Salehi-Bakhtiari | F16L 13/146 |
| 2017/0336008 | A1* | 11/2017 | Hankins | F16L 33/34 |
| 2018/0038531 | A1* | 2/2018 | Hattass | F16L 37/0985 |
| 2018/0245722 | A1* | 8/2018 | Yashin | F16L 37/148 |
| 2018/0283586 | A1* | 10/2018 | Larson | F16L 19/086 |
| 2019/0009479 | A1* | 1/2019 | DuPont, Jr. | B29C 66/52241 |
| 2019/0339028 | A1* | 11/2019 | Fernandes | H01M 10/613 |
| 2020/0032939 | A1* | 1/2020 | Flach | F16L 37/24 |
| 2021/0108747 | A1* | 4/2021 | Iida | F16L 37/252 |
| 2021/0199220 | A1* | 7/2021 | Truong | F16L 37/0841 |
| 2021/0285585 | A1* | 9/2021 | Flynn | B21K 25/00 |
| 2021/0325212 | A1* | 10/2021 | Lamport | B01F 25/4316 |
| 2021/0332924 | A1* | 10/2021 | Graves | F16L 25/009 |
| 2021/0364112 | A1* | 11/2021 | Barthel | F16L 37/0885 |
| 2022/0010905 | A1* | 1/2022 | Schröter | F16L 37/0985 |
| 2022/0169125 | A1* | 6/2022 | Borghi | B60L 50/64 |
| 2022/0275897 | A1* | 9/2022 | Okada | F16L 41/021 |
| 2022/0299141 | A1* | 9/2022 | Choo | F16L 37/0982 |

FOREIGN PATENT DOCUMENTS

| | | | | |
|---|---|---|---|---|
| EP | 3522291 | A1 * | 8/2019 | F16L 37/144 |
| WO | WO2012117697 | | 9/2012 | |

OTHER PUBLICATIONS

Eurpean Patent Office Search & Written Opinion, Dated Jun. 10, 2022, 9 pages.

EPO Communication pursuant to Article 94(3) issued in App. No. EP22153657.6, dated Sep. 4, 2023, 6 pages.

* cited by examiner

HIGH TOLERANCE QUICK CONNECT COUPLING

FIELD OF THE DISCLOSURE

This disclosure relates to tube and hose fittings that accommodate movement of the fitting relative to a tube coupled to the fitting.

BACKGROUND OF THE DISCLOSURE

There are numerous applications of relatively rigid plastic or rubber tubing assemblies that are pre-assembled for conveying a fluid from a first component to at least a second component that is at a specific distance and orientation relative to the first component. It has not been practical to manufacture components with fluid inlets and outlets that are precisely located to facilitate connection between components using a prefabricated inflexible tubing assembly. Accordingly, flexible tubing is used when possible and/or tubing assemblies are fabricated by skilled craftsmen. However, for mass production of certain products, such as systems used in motor vehicles, it is desirable that a pre-assembled relatively rigid tubing assembly can be properly positioned and coupled to fluid ports (e.g., fluid inlets and/or outlets) that may not be precisely positioned, but are instead positioned within a tolerable variance from the nominal location. Preferably, the tubing assembly is capable of accommodating small variances in fluid port locations without requiring manual adjustments, such that unskilled workers and/or robots can position and couple the tubing assembly to the appropriate fluid ports.

SUMMARY OF THE DISCLOSURE

The disclosed tube fitting allows a relatively rigid prefabricated tubing assembly to be installed to connect at least one fluid outlet with at least one fluid inlet, while accommodating variations in the position of the fluid inlets and outlets with respect to each other. The fittings include a core having at least one tubular end section and at least one tubular coupling fitted over and slidably movable on the end section. An o-ring seal is located in an annular groove in either an outer surface of the end section or the inner surface of the coupling to provide a fluid-tight seal between the core and the coupling. A protuberance extends from an outer surface of the tubular end section and into a recess in the inner surface of the coupling to limit the range of movement of the coupling with respect to core within a predetermined tolerance based on the particular application.

DETAILED DESCRIPTION

The disclosed fittings are designed for use in prefabricated assemblies that accommodate manufacturing dimensional tolerances in the specified locations of fluid inlet ports and fluid outlet ports in mass produced products by providing each fitting with at least one coupling that is slidably movable on an end of a fitting core within a predetermined limit, and sealingly attached to the end of the fitting core. The disclosed fittings are described and illustrated as tee fittings. However, the term fitting is meant to encompass any device used to create a branched fluid connection (e.g., tees, crosses, Y-branched fittings, etc.) or to change the direction of flow (e.g., an elbow fitting). The words tube, tubular and similar terms are meant to encompass generally any plastic or rubber tubular fluid conduits (e.g., hoses, tubes, pipes, etc.).

The distal end of the coupling (i.e., the end furthest from the center of the fitting core) can be joined to plastic or rubber tubing in any suitable manner (e.g., cemented, swage-locked, etc.).

Figure 1:
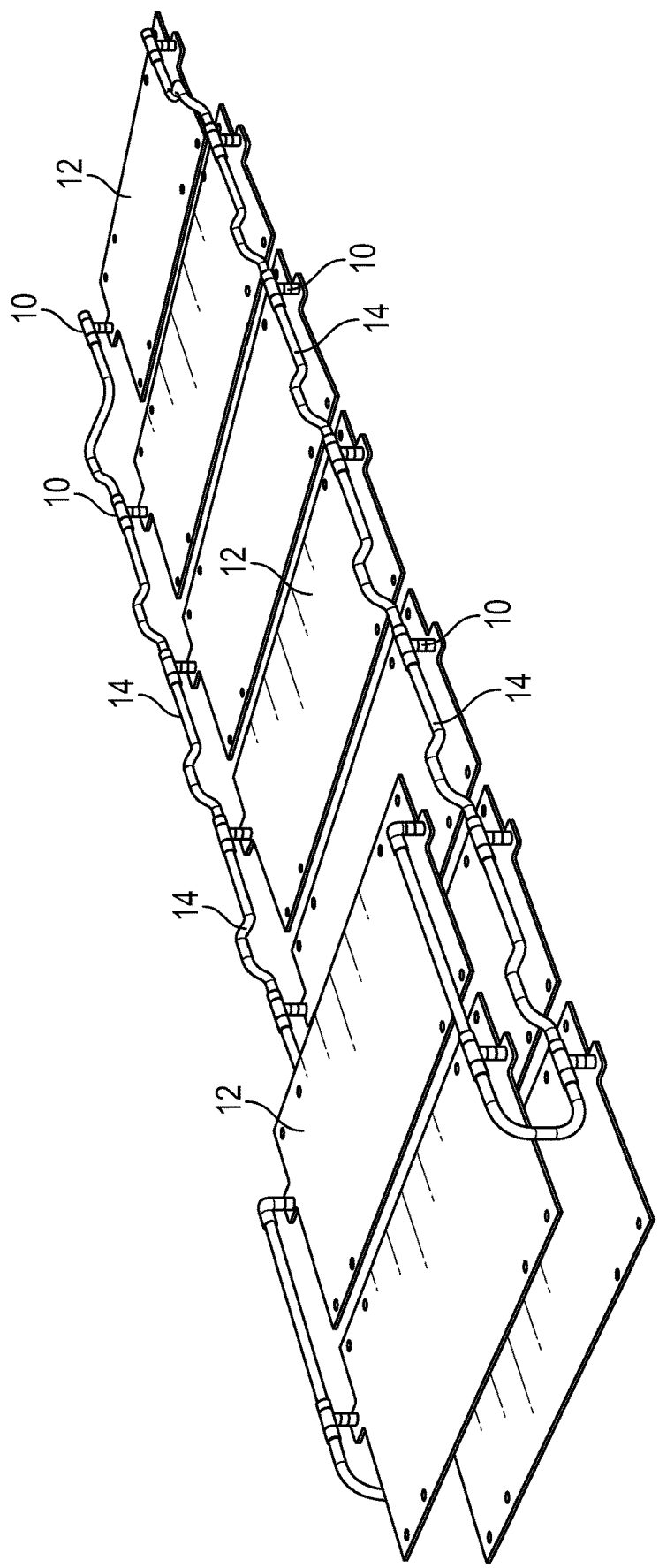
FIG. 1 is a perspective view of a particular application of the disclosed tube fitting in a coolant manifold assembly for a battery pack of an electric vehicle.

FIG. 1 illustrates a particular application for the disclosed fittings 10 in coolant manifold assemblies for conveying a fluid coolant to and from a plurality of cooling plates 12 (e.g., for cooling batteries used to power an electric vehicle). This application includes two manifolds, each manifold comprising a plurality of tee fittings 10 having opposite ends in a straight run that are joined in series by tubing sections 14.

Figure 2:
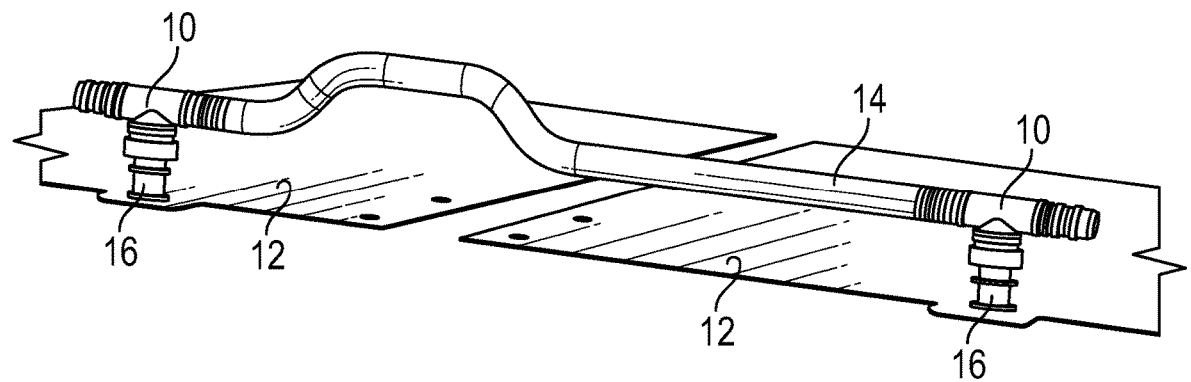
FIG. 2 is a perspective view of a segment of the manifold assembly showing connections between adjacent cooling plates.

FIG. 2 shows a section of a coolant manifold assembly having tee fittings 10 for conveying a coolant to the inlet ports 16 of two adjacent cooling plates 12. In order to accommodate efficient and economical mass production, the manifold assemblies are preferably prefabricated and include quick connect couplings between the lateral runs of the tee fittings and the inlet/outlet ports 16. This allows the manifold assemblies to be attached by merely pushing the fittings 10 onto the ports 16 using unskilled labor or robots. However, a potential problem arises due to position tolerances of the ports 16. For example, in a particular electric vehicle battery cooling application, the ports have a positional tolerance of ±3 mm and the tubing has an assembly tolerance of ±2.5 mm at each joint, providing a total tolerance of ±5.5 mm at each connection between adjacent ports, which cannot necessarily be accommodated by the flexibility of the tube assembly. The disclosed fittings 10 solve this potential problem by allowing movement of a tube section 14 with respect to tee fitting 10 while maintaining a fluid-tight connection between the fittings and the tube section.

Figure 3:
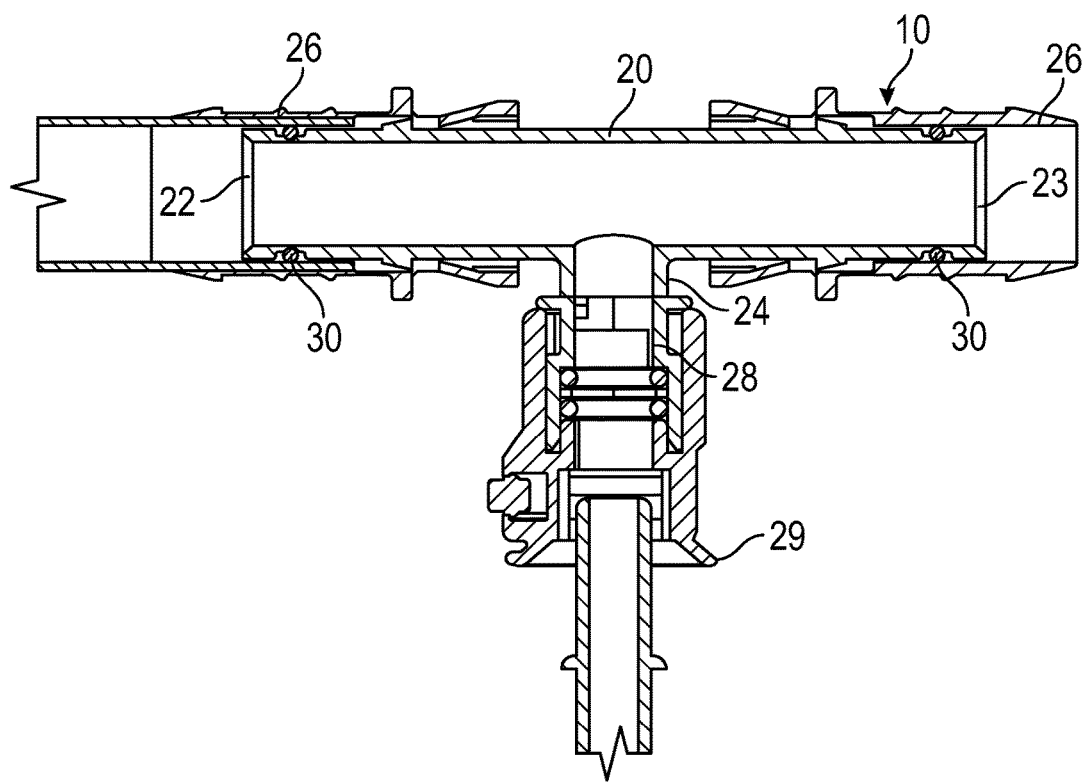
FIG. 3 is an elevational cross-section view of a tee fitting in accordance with the disclosure.

FIG. 3 shows a tee fitting 10 having core 20 defining a straight run between opposite tubular ends 22, 23 and a lateral leg 24. Sealingly and movably disposed over each of the opposite ends 22, 23 is a tubular coupling sleeve 26. A quick-connect coupling 28 is provided on the lateral leg 24. A frustoconical recess 29 or other feature can be provided at the extremity of the quick connect coupling to guide the fitting into alignment for coupling when there is a misalignment between the fitting and a fluid port to which the fitting is to be connected within a predetermined tolerance.

Figure 4:
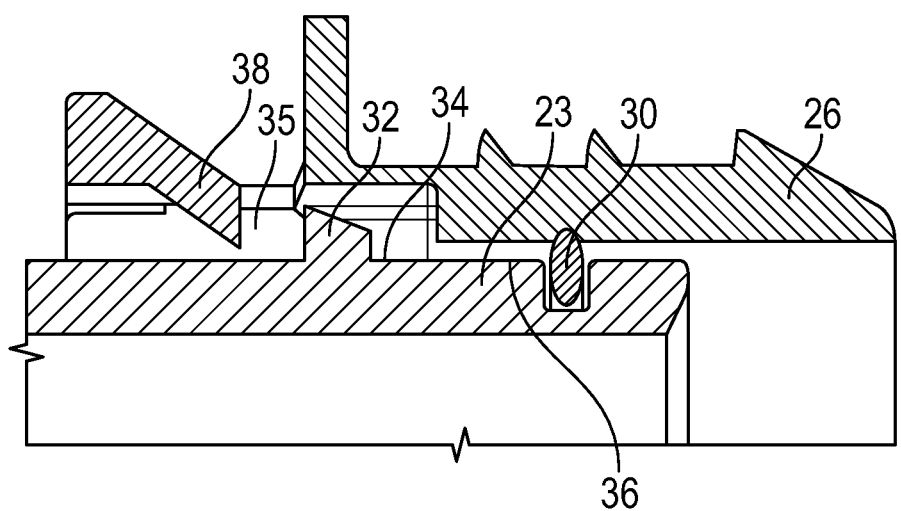
FIG. 4 is an enlarged view of a portion of the tee fitting shown in FIG. 3.

FIG. 4 shows details of the sealing and motion limiting mechanisms that may be employed. In the illustrated fitting 10, an o-ring seal member 30 is located in an annular groove recessed into each of the outer surfaces of the ends of the core 20. However, it is also possible to position seal 30 in a groove recessed into the inner surface of coupling 26. The inner diameter of coupling 26 is about equal to or slightly larger than the outer diameter of the end section of the core, whereby coupling 26 can slidably move with respect to the end section 23 of core 20 while seal 30 prevents fluid leaks between the core 20 and coupling 26. Two or more o-rings can be provided in corresponding grooves to improve fluid-tight sealing between the core and the coupling sleeve.

In order to limit the amount of movement of coupling 26 with respect to core 20 within a prescribed range or tolerance, the core end 23 has a protuberance 32 that projects away from the outer surface 34 of end 23 into a recessed space 35 defined in the inner wall 36 of coupling 26. The recess 35 and the protuberance 32 have opposite and respective stop surfaces that limit the range of motion to within the predetermined range (tolerance). Protuberance 32 can be provided with a ramped and radially outwardly facing surface that can engage a complementary ramped surface on a barb 38 formed on the inner wall of the coupling, whereby the coupling can be easily joined to the core during assembly of the fitting, while non-destructive decoupling after assembly is prevented. Recess 35 and protuberance 32 can be an annular groove or an angularly confined key groove.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A tube fitting comprising:
    a core defining a tubular conduit for conveying fluid from a tube connectable to the fitting and having at least one tubular end section, the tubular end section having a surface at an outer diameter, and a protuberance extending away from an outer surface of the end section;
    at least one tubular coupling sleeve having a distal end, the distal end of the tubular coupling sleeve having a first inner diameter that is equal to or larger than the outer diameter of the end section of the core, the coupling sleeve slidably fitted over the end section of the core, a surface at an inner diameter of the coupling sleeve having a recess spaced from the distal end of the coupling sleeve, the protuberance located in the recess to limit sliding movement of the coupling sleeve relative to the core;
    at least one o-ring seal radially disposed between the surface at the outer diameter of the end section of the core and the surface at the inner diameter of the tubular coupling sleeve; and
    wherein the protuberance has a ramped and radially outwardly facing surface engaging a complementary ramped surface on a barb at an inner wall of the coupling sleeve, and wherein the protuberance and the recess are sized and provided with stop surfaces that allow a predetermined range of motion of the tubular coupling sleeve relative to the core while the o-ring seal prevents fluid leaks between the tubular conduit defined by the core and the respective tubular coupling sleeve, wherein the core defines two opposite tubular end sections, and wherein a tubular coupling sleeve of the at least one tubular coupling sleeve is disposed over each of the opposite tubular end sections.

2. The fitting of claim 1, wherein the fitting has a tee shaped configuration with three ends to which tubing can be coupled.

3. The fitting of claim 2, wherein the tee shaped configuration includes a straight run having opposite ends to which tubing can be coupled and a lateral run extending perpendicularly from the straight run, the lateral run having a quick-connect coupling adapted to push couple with an inlet port or outlet port of a cooling plate.

4. The fitting of claim 3, wherein the quick-connect coupling includes a recess at its extremity to guide the fitting into alignment with a fluid port when there is a misalignment between the fitting and the port.

5. The fitting of claim 4 in which each of the opposite ends of the straight run include the tubular coupling sleeve slidable on the tubular end section.

6. A manifold assembly comprising a plurality of fittings in accordance with claim 5 and a plurality of tubes, each tube having a first end connected to a coupling sleeve of one of the fittings and a second end connected to another one of the fittings.

7. A battery coolant assembly comprising a plurality of cooling plates, each cooling plate having an inlet port and an outlet port, first and second manifold assemblies in accordance with claim 6, wherein each quick-connect coupling of the first manifold assembly is connected to a respective one of the inlet ports of the cooling plates, and each quick-connect coupling of the second manifold assembly is connected to a respective one of the outlet ports.

8. A tube fitting comprising:
    a core having two opposite tubular end sections, the tubular end sections each having a surface at an outer diameter, and a protuberance extending away from an outer surface of the respective end section;
    a tubular coupling sleeve disposed over each of the tubular end sections, each tubular coupling sleeve having a distal end, the distal end of each tubular coupling sleeve having a first inner diameter that is equal to or larger than the outer diameter of the respective end section of the core, each coupling sleeve slidably fitted over the respective end section of the core, a surface at an inner diameter of each coupling sleeve having a recess spaced from the distal end of the respective coupling sleeve, the protuberance located in the recess to limit sliding movement of the respective coupling sleeve relative to the core;
    at least one o-ring seal radially disposed between the surface at the outer diameter of the end section of the core and the surface at the inner diameter of the tubular coupling sleeve, and
    wherein the protuberance has a ramped and radially outwardly facing surface engaging a complementary ramped surface on a barb at an inner wall of the respective coupling sleeve, and wherein the protuberance and the recess are sized and provided with stop surfaces that allow a predetermined range of motion of the tubular coupling sleeve relative to the core while the o-ring seal prevents leaks between a tubular conduit defined by the core and the respective tubular coupling sleeve.

9. The fitting of claim 8, wherein the fitting has a tee shaped configuration with three ends to which tubing can be coupled.

10. The fitting of claim 9, wherein the tee shaped configuration includes a straight run having opposite ends to which tubing can be coupled and a lateral run extending perpendicularly from the straight run, the lateral run having a quick-connect coupling adapted to push couple with an inlet port or outlet port of a cooling plate.

11. The fitting of claim 10, wherein the quick-connect coupling includes a recess at its extremity to guide the fitting into alignment with a fluid port when there is a misalignment between the fitting and the port.

12. The fitting of claim 11 in which each of the opposite ends of the straight run include the tubular coupling sleeve slidable on the tubular end section.

13. A manifold assembly comprising a plurality of fittings in accordance with claim 12 and a plurality of tubes, each tube having a first end connected to a coupling sleeve of one of the fittings and a second end connected to another one of the fittings.

14. A battery coolant assembly comprising a plurality of cooling plates, each cooling plate having an inlet port and an outlet port, first and second manifold assemblies in accordance with claim 13, wherein each quick-connect coupling of the first manifold assembly is connected to a respective one of the inlet ports of the cooling plates, and each quick-connect coupling of the second manifold assembly is connected to a respective one of the outlet ports.

\* \* \* \* \*